(12) United States Patent
Bendewald et al.

(10) Patent No.: US 10,023,091 B2
(45) Date of Patent: Jul. 17, 2018

(54) VEHICLE HAVING A DRIVER ASSISTANCE DEVICE

(71) Applicant: Volkswagen Aktiengesellschaft, Wolfsburg (DE)

(72) Inventors: Lennart Bendewald, Wolfsburg (DE); Linn Hackenberg, Wolfsburg (DE); Bjoern Strasdat, Braunschweig (DE); Valentin Rex, Aachen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 66 days.

(21) Appl. No.: 15/258,377

(22) Filed: Sep. 7, 2016

(65) Prior Publication Data

US 2016/0375811 A1    Dec. 29, 2016

Related U.S. Application Data

(63) Continuation of application No. PCT/EP2015/053986, filed on Feb. 26, 2015.

(30) Foreign Application Priority Data

Mar. 7, 2014   (DE) .................. 10 2014 003 023

(51) Int. Cl.
*B60N 3/10*     (2006.01)
*B60N 3/00*     (2006.01)

(52) U.S. Cl.
CPC ............. *B60N 3/102* (2013.01); *B60N 3/001* (2013.01); *B60N 3/002* (2013.01)

(58) Field of Classification Search
CPC ......... B60N 3/102; B60N 3/001; B60N 3/002
See application file for complete search history.

(56) References Cited

U.S. PATENT DOCUMENTS 4,019,601 A     4/1977  Di Giovanni
4,131,313 A  * 12/1978  Jacobs .................... B60R 7/088
                                                        224/275

(Continued)

FOREIGN PATENT DOCUMENTS

CN       101945776 A      1/2011
DE       25 17 741 A1    11/1975

(Continued)

OTHER PUBLICATIONS

Paul A. Eisenstein, "Rinspeed Goes Autonomous with XchangE," The Detroit Bureau, at http://www.thedetroitbureau.com/2013/12/rinspeed-goes-autonomous-With-xchange, pp. 1-4 (Dec. 16, 2013).

*Primary Examiner* — Calvin Cheung
(74) *Attorney, Agent, or Firm* — Muncy, Geissler, Olds & Lowe, P.C.

(57) ABSTRACT

A vehicle, including a driver assistance device with the aid of which an autonomous driving mode without driver intervention may be carried out in an autopilot mode, and including at least one storage element for storing objects, such as a cup holder and/or a storage table, which is adjustable between a position of non-use and at least one position of use. The driver assistance device is assigned a control unit, which enables an adjustment of the storage element into the position of use when the autopilot mode is activated and disables an adjustment of the storage element into the position of use when the autopilot mode is deactivated.

10 Claims, 5 Drawing Sheets

(56) References Cited

U.S. PATENT DOCUMENTS

| | | | | |
|---|---|---|---|---|
| 6,161,896 A * | 12/2000 | Johnson | ............... | B60R 7/043 |
| | | | | 297/188.08 |
| 8,260,482 B1 | 9/2012 | Szybalski et al. | | |
| 8,606,455 B2 * | 12/2013 | Boehringer | ........... | B60W 30/17 |
| | | | | 701/23 |
| 9,227,531 B2 * | 1/2016 | Cuddihy | ............... | B60N 2/203 |
| 9,248,743 B2 | 2/2016 | Enthaler et al. | | |
| 9,834,121 B2 * | 12/2017 | Riefe | .................... | B60N 3/005 |
| 2009/0001749 A1 * | 1/2009 | Johnson | ................. | B60R 7/043 |
| | | | | 296/37.15 |
| 2016/0231855 A1 * | 8/2016 | Bendewald | .......... | B60W 50/14 |
| 2016/0375924 A1 * | 12/2016 | Bodtker | ................ | B62D 1/046 |
| | | | | 74/552 |
| 2017/0284819 A1 * | 10/2017 | Donnelly | .............. | G06Q 50/30 |
| 2017/0297606 A1 * | 10/2017 | Kim | ...................... | B62D 1/181 |
| 2017/0316696 A1 * | 11/2017 | Bartel | .................... | G08G 1/202 |

FOREIGN PATENT DOCUMENTS

| | | | |
|---|---|---|---|
| DE | 199 06 052 A1 | 8/2000 | |
| DE | 199 08 130 A1 | 8/2000 | |
| DE | 101 32 515 A1 | 1/2003 | |
| DE | 10 2005 058 636 A1 | 6/2007 | |
| DE | 10 2009 048 954 A1 | 4/2011 | |
| DE | 10 2012 010 887 A1 | 12/2013 | |
| EP | 3153346 A1 * | 4/2017 | ............... B60N 2/02 |

\* cited by examiner

VEHICLE HAVING A DRIVER ASSISTANCE DEVICE

This nonprovisional application is a continuation of International Application No. PCT/EP2015/053986, which was filed on Feb. 26, 2015, and which claims priority to German Patent Application No. 10 2014 003 023.7, which was filed in Germany on Mar. 7, 2014, and which are both herein incorporated by reference.

BACKGROUND OF THE INVENTION

Field of the Invention

The invention relates to a vehicle, which includes a driver assistance device, which is able to operate in the autopilot mode. The invention also relates to a method for operating a vehicle in an autopilot mode of this type.

Description of the Background Art

Driver assistance systems are known, which at least partially or completely permit an autonomous driving mode, in which the driver has a high degree of freedom with respect to activities during the autonomous driving mode. In the present application, an autonomous driving mode may be understood to mean the at least partially or completely autonomous driving of a vehicle supported by assistance systems. Assistance systems of this type handle the control of the longitudinal and transverse dynamic of the vehicle, the acceleration, braking and/or steering operations. A generic vehicle having a driver assistance device of this type is known from DE 10 2009 048 954 A1, which corresponds to U.S. Pat. No. 8, 606, 455, with the aid of which such an autonomous driving mode without driver intervention may be carried out in an autopilot mode.

In common practice, vehicles also have a large number of storage options in the vehicle interior, for example storage compartments, storage trays or tables. Reference is hereby made to DE 199 06 052 A1, which is herein incorporated by reference, by way of example, from which a storage device in an instrument panel of a motor vehicle is known. The storage device is designed as a drawer, which is mounted in the instrument panel in such a way that it may slide in and out. Different types of table concepts are also generally known. Tables and storage trays may be mounted, for example, on the back of the front seats to make it easier to work with laptops, for example. Alternatively, tables may be provided centrally in the rear area of the vehicle, which may be used by multiple people at the same time.

SUMMARY OF THE INVENTION

It is therefore an object of the invention to provide a vehicle so that the functionality of storage elements may be increased, particularly when the autopilot mode is activated.

In an exemplary embodiment, the driver no longer has to continuously monitor a traffic situation when driving in an autopilot mode and correspondingly has time for other activities, such as reading, relaxing and eating. Against this background, the invention provides an adaptive storage concept, which may be adapted to the use requirements, specifically in an autonomous driving mode. The driver assistance device can thus be assigned a control unit, with the aid of which an adjustment of the storage element into the position of use may be enabled when the autopilot mode is activated. During normal driving mode, the storage element can be unable to assume the position of use, so as not to possibly interfere with the interaction space of the driver. This means that, when the autopilot mode is deactivated, the control unit disables an adjustment into the position of use.

In an embodiment, the storage element may be adjusted into at least one position of use in normal driving mode with driver intervention, i.e., when the autopilot mode is deactivated. Conversely, the storage system may be adjusted into a special, autopilot position of use, which is different therefrom, when the autopilot mode is activated.

The storage element according to an embodiment of the invention may be assigned, for example, a multi-stage retraction and extension mechanism, which the aid of which the available storage area of the storage element may be varied. The retraction and extension mechanism may have, by way of example, a three-stage design, i.e., the storage element may be adjusted from its position of non-use into a first position of use (first stage), into a second position of use (second stage) or into the autopilot position of use (third stage). In the first stage, for example, only a cup holder or a small area of the table may be enabled. In a second stage, however, a larger storage area can be exposed. In the third stage, the storage element may provide the largest storage area. The third stage is preferably activatable only in the autopilot mode, in order to avoid interference with the interaction space of the driver, as indicated above (during normal driving mode, i.e., when the autopilot mode is deactivated).

If a vehicle-initiated retraction takes place (i.e., a shutdown or deactivation of the autopilot mode), the storage element may be automatically (i.e., autonomously) returned to the second stage, the first stage or the position of non-use from the aforementioned third stage. In addition, weight, position and driver monitoring sensors (for example, interior cameras) may be provided, which detect whether objects are present on the storage element which could slide off during the adjustment of the storage element. In a case of this type, for example, the retraction of the storage element into is position of non-use may be blocked.

In an embodiment, the control unit may only enable an adjustment of the storage element at least into the autopilot position of use (referred to above as the third stage) when the autopilot mode is activated. In addition, the control unit may disable such an adjustment of the storage element into the autopilot position of use when the autopilot mode is deactivated.

The adjustment operation of the storage element into the positions of use or into the autopilot position of use may generally take place manually or with the aid of external energy, i.e., for example with the aid of an electrically activatable actuator. In this case, the adjustment operation of the storage element into a position of use may be initiated, for example, by actuating a control element. With a view toward increased comfort, however, the storage element can be autonomously adjusted into the autopilot position of use upon activation of the autopilot mode, without a driver intervention being required for this purpose (e.g., actuating a control element).

The storage element may be disposed in an arbitrary location in the vehicle interior, for example on an instrument panel, on a center console and/or on a side trim. The adjustment of the storage element between the position of non-use and the different positions of use may furthermore take place in a translatory and/or rotatable manner in the vehicle longitudinal, transverse and/or vertical direction(s) depending on the installation space conditions.

To further increase comfort, the driver assistance device may include another control unit for activating at least one vehicle seat. The vehicle seat control unit may be used to adjust a vehicle seat, in particular the driver's seat, into a comfort position upon the activation of the autopilot mode. The displacement into the comfort position may, for example, take place automatically. With a view toward vehicle safety, the displacement of the vehicle seat into the comfort position may take place only when the autopilot mode is activated, and the displacement into the comfort position is disabled when the autopilot mode is deactivated.

In an embodiment, the storage element and the driver's seat may be combined into a shared comfort unit. In the comfort unit, the storage element may adapt to the comfort position of the vehicle seat upon the activation of the autopilot mode. For example, an adjustment of the storage element into its autopilot position of use may be enabled only if both the autopilot mode is activated and the vehicle seat has already been adjusted into its comfort position.

The displacement of the vehicle seat into its comfort position can take place autonomously immediately upon the activation of the autopilot mode, without any additional control elements being operated manually for this purpose. Alternatively, both the storage element may be adjusted into the autopilot position of use and the driver's seat into its comfort position upon the activation of the autopilot mode. The two adjustment operations can be coordinated with each other and may take place, e.g., autonomously and in a time-correlated manner, i.e., substantially simultaneously.

Upon the deactivation of the autopilot mode or immediately prior to such a deactivation, it is advantageous if the storage element is autonomously returned from its autopilot position of use into a normal position of use or into the position of non-use. In the same way, the vehicle seat may also be autonomously displaced from its comfort position back into a position suitable for driving.

The storage element may have an arbitrary design. For example, the storage element may be an adjustable table, on the upper side of which an additionally slidable storage shell is disposed. The storage shell may be designed to be removable and thus washable. For easy mounting on the table, the storage shell may be mounted, for example, by magnetic force. In this case, the storage shell may be designed to have magnetic elements and/or a metal coating.

The aforementioned adjustable table may also be used as an interactive surface and inductively charge, for example, smartphones placed thereupon or transfer their contents to the on-board head unit by NFC (Near-Field Communication).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
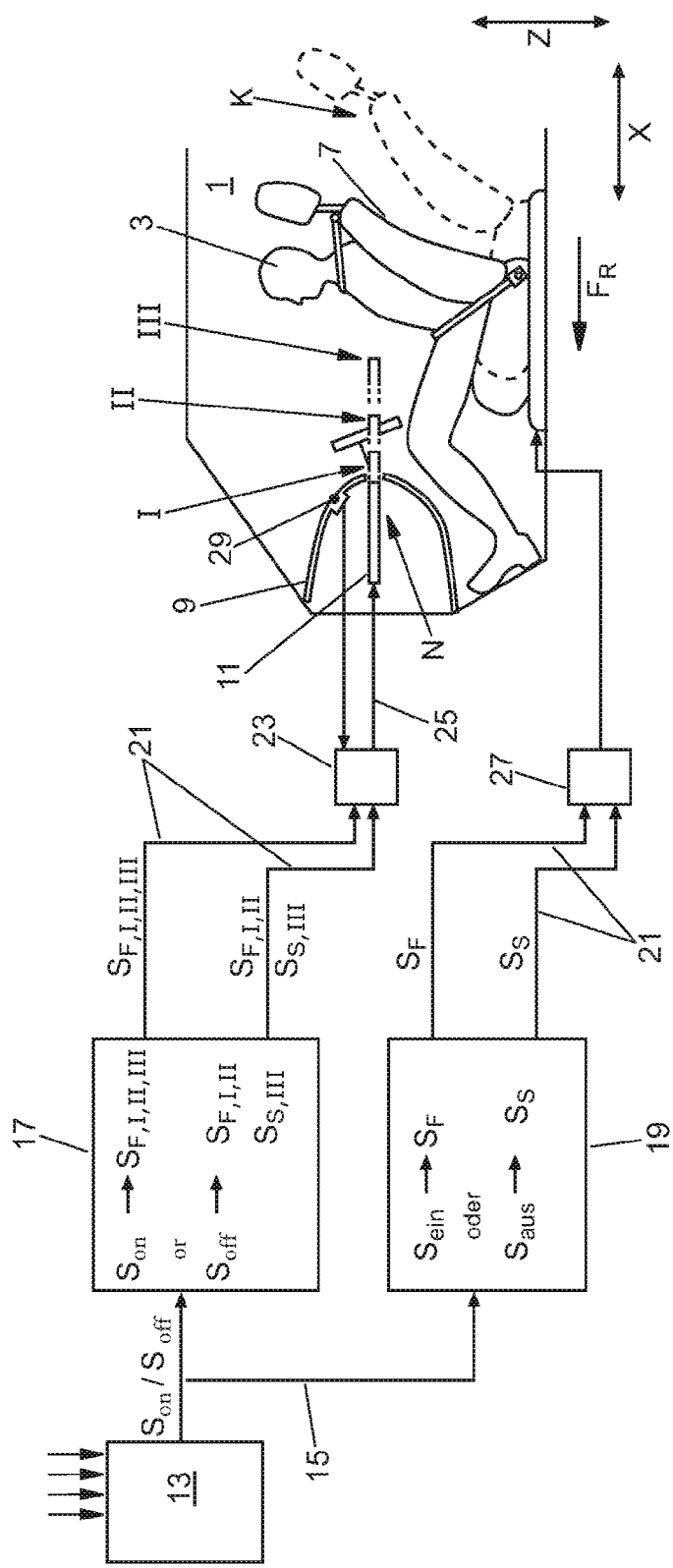
FIG. 1a shows a block diagram of a driver assistance device in a vehicle according to an exemplary embodiment.

An exemplary vehicle interior 1, delimited by a contour line, of a motor vehicle is shown in FIG. 1a by way of example. A driver 3, belted into a vehicle seat 7, is indicated in vehicle interior 1, as well as a block diagram of a driver assistance system. The function blocks of the driver assistance system as well as vehicle interior 1 are prepared with a view toward an easy understanding of the invention. FIG. 1a therefore shows only a greatly simplified representation, which does not reflect a realistic layout of the driver assistance system.

In vehicle interior 1, driver 3 is limited toward the front in direction of travel $F_R$ by an instrument panel 9. A storage table 11 is integrated into instrument panel 9 as an example of a storage element. The latter is adjustable horizontally in vehicle longitudinal direction x in FIG. 1a. Storage table 11 in FIG. 1 is shown in its position of non-use N, in which it is disposed within instrument panel 9, completely shielded from view. Storage table 11 is adjustable from its position of non-use N into a first position of use I, a second position of use II and an autopilot position of use III.

In positions of use I, II, III, which are indicated in FIG. 1a by dot-dashed lines, storage table 11 projects out of instrument panel 9 with different projections. Driver's seat 7 may also be adjusted from the position shown by solid lines into a comfort position K (indicated by dashed lines), in which the seating surface is displaced to the rear in vehicle longitudinal direction x, and the back of vehicle seat 7 is also inclined toward the rear.

Storage table 11 and vehicle seat 7 form a comfort unit, in which, according to FIG. 1, both storage table 11 and vehicle seat 7 are in signal connection with a driver assistance device 13. Driver assistance device 13 may operate the vehicle in an autopilot mode, in which an autonomous driving mode without driver intervention is made possible, as a function in input parameters, which are not specified in greater detail. In this case, driver assistance device 13 handles the control of the longitudinal and transverse dynamic of the vehicle, i.e., the acceleration, braking and/or steering operations.

Driver assistance device 13 is connected to control units 17, 19 via signal lines 15 for the purpose of activating storage table 11 and vehicle seat 7. In storage table control unit 17, it is determined whether the autopilot mode is activated or deactivated on the basis of signals $S_{on}$ or $S_{off}$ coming from driver assistance device 13. Signal $S_{on}$ is detected when the autopilot mode is activated, and signal $S_{off}$ is detected when the autopilot mode is deactivated. Control unit 17 is connected to an actuator 23 via control lines 21, for example an electric motor, which is in driving connection 25 with an adjustable storage table 11. Storage table 11 may be adjusted into its different positions N, I, II or III by correspondingly activating actuator 23. In the same way, driver's seat control unit 19 is also connected to an actuator 27 of driver's seat 7 for the purpose of displacing driver's seat 7 into comfort position K.

When the autopilot mode is activated, storage table control unit 17 in FIG. 1a generates an enable signal $S_{F, I, II, III}$, with the aid of which actuator 23 may be activated. Actuator 23 is enabled with the aid of this enable signal in order to optionally adjust storage table 11 into first position of use I, into second position of use II or into autopilot position of use III. Driver 3 is therefore provided with three adjustment options or possibilities, of which he may select one option (i.e., position of use I, II or III) by actuating a control element 29 situated on instrument panel 9. This means that actuator 23 adjusts storage table 11 into one of enabled positions of use I, II or autopilot position of use III only after control element 29 is actuated.

Parallel thereto, vehicle seat control unit 19 generates an enable signal $S_F$ when the autopilot mode is activated, on the basis of which actuator 27 of vehicle seat 7 is adjusted into its comfort position K.

When the autopilot mode is deactivated, both control units 17, 19 each receive a signal $S_{off}$. On the basis thereof, an enable signal $S_{F, I, II}$ and a disable signal $S_{S, III}$ are generated in storage table control unit 17. In this case, only the adjustment option to first or second position of use I, II is enabled in actuator 23. This means that driver 3 is able to choose only between first and second position of use I, II by actuating control element 29. However, autopilot position of use III is disabled rather than enabled, based on disable signal $S_{S, III}$. In the same way, actuator 23 is enabled when the autopilot mode is deactivated, and the driver is provided with the choice between position of use I, position of use II and position of use III. Correspondingly, driver 3 may generate a disable signal $S_S$ in vehicle seat control unit 19, with the aid of which a displacement of driver seat 7 into comfort position K is blocked.

In the event that a vehicle-initiated retraction takes place while the autopilot mode is still activated, i.e., if driver 3 himself must take over control of the vehicle again, storage table 11 is returned to its position of use I, II or its position of non-use N. At the same time, driver's seat 7 is also returned from its comfort position K into a position suitable for driving for driver 3.

Figure 1B:
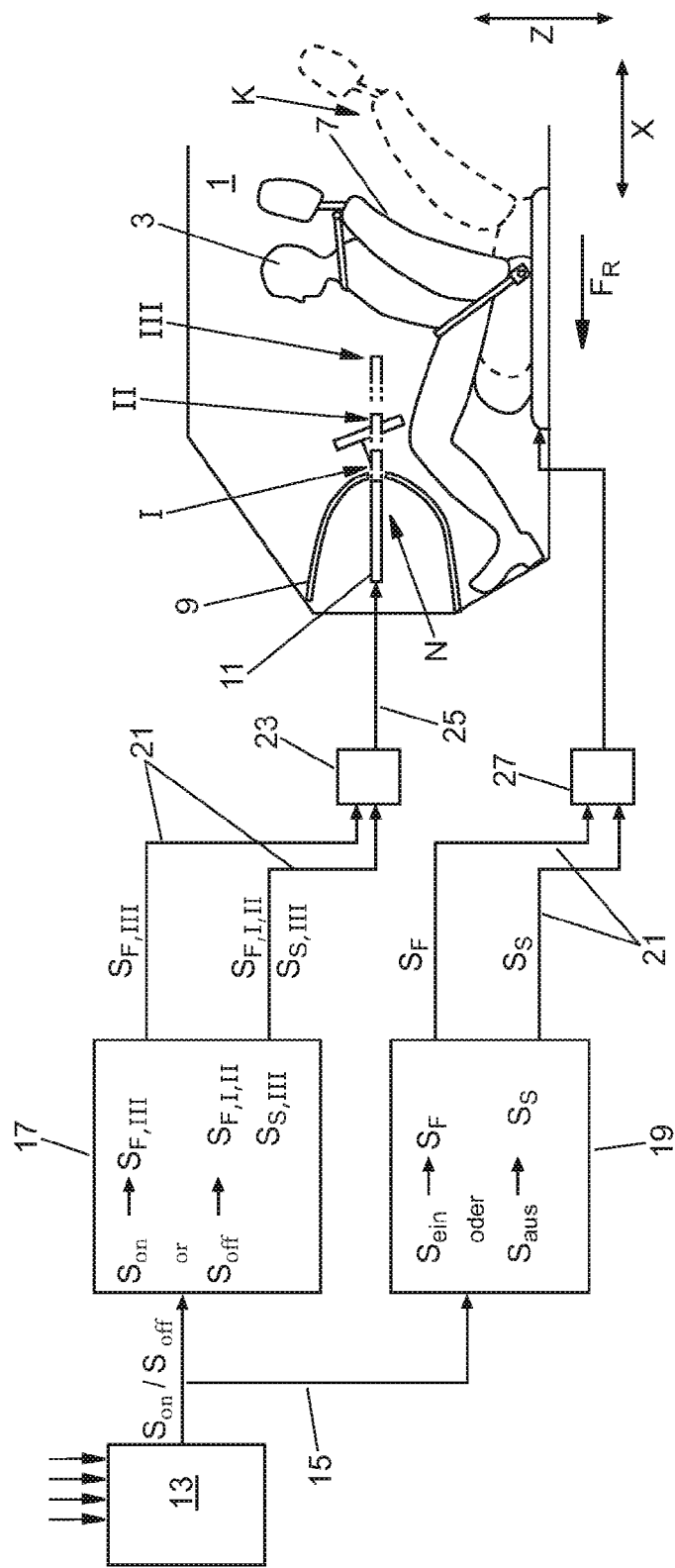
FIG. 1b shows a top view according to FIG. 1a of a driver assistance device according to an exemplary embodiment.

FIG. 1b shows a second exemplary embodiment, whose basic layout and functionality largely correspond to the first exemplary embodiment according to FIG. 1a. As in FIG. 1a, actuators 23, 27 are also activated by enable or disable signals in FIG. 1b, based on signals $S_{on}$ or $S_{off}$. Reference is thus hereby made to the previous description.

In contrast to FIG. 1a, an enable signal $S_{F, III}$ is activated in storage table control unit 17 when the autopilot mode is activated, with the aid of which actuator 23 is activated. This means that, in FIG. 1b, only autopilot position of use III is enabled when the autopilot mode is activated, while the other positions of use I, II are disabled. The adjustment of storage table 11 into autopilot position of use III takes place automatically in FIG. 1b—in contrast to FIG. 1a—i.e., without any prior additional actuation of control element 29 (FIG. 1a).

Figure 2:
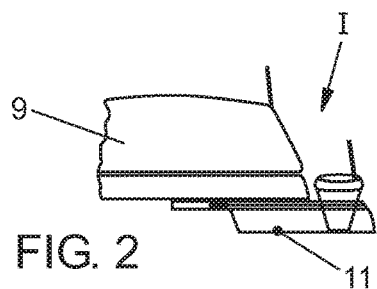
FIGS. 2 to 4 show different positions of use of the storage element.
Figure 3:
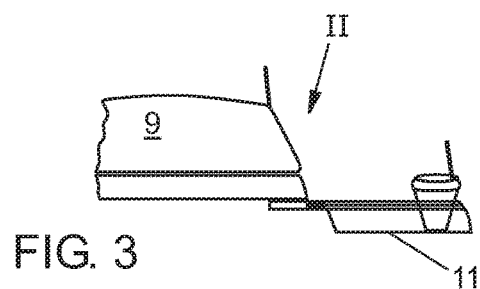
Figure 4:
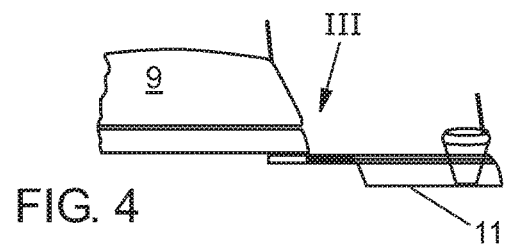

The two positions of use I, II as well as autopilot position of use III are illustrated in FIGS. 2 through 4. Accordingly, storage table 11 is extended out of instrument panel 9 only with a slight projection in position of use I (FIG. 2), so that only a cup holder is exposed. In position of use II (FIG. 3), on the other hand, another storage option is exposed in addition to the cup holder function. In autopilot position of use III (FIG. 4), storage table 11 is displaced out of instrument panel 9 with the largest possible projection.

Figure 5:
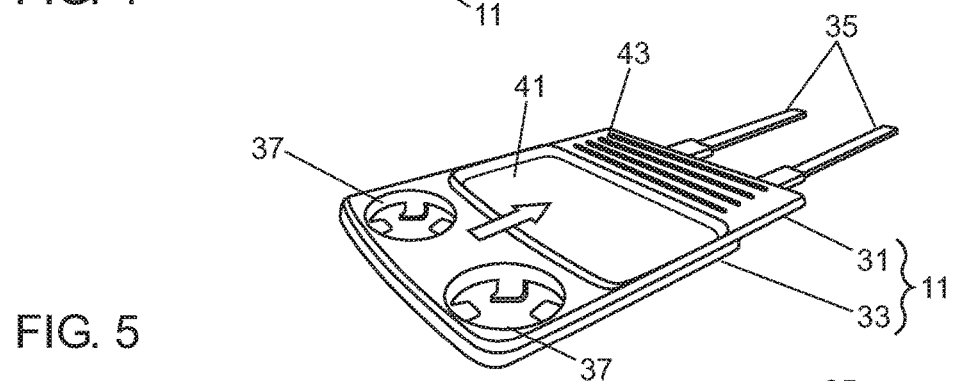
FIGS. 5 to 7 show a storage element designed as a table in different positions of use.
Figure 6:
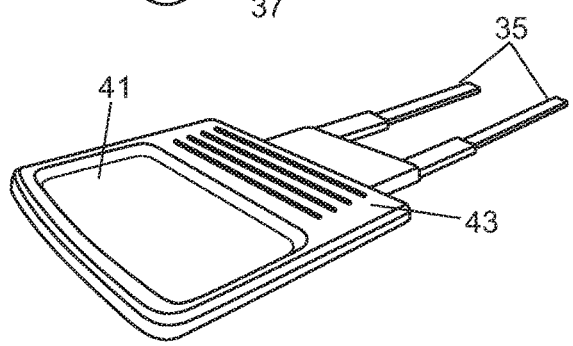
Figure 7:
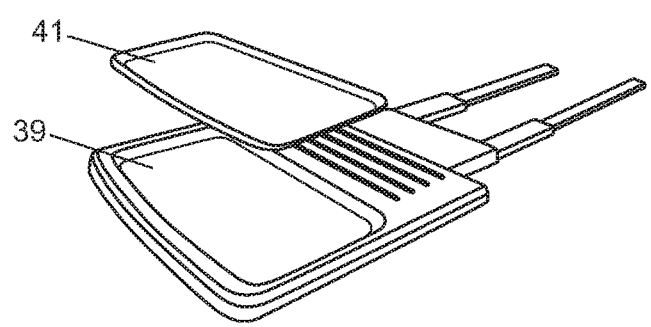

A exemplary embodiment of adjustable storage table 11 is illustrated in different function positions in FIGS. 5 through 7. According to FIG. 5, storage table 11 has an upper and a lower supporting plate 31, 33. Upper supporting plate 31 is connected to instrument panel 9 via telescopic rails 35.

Lower supporting plate 33 is mounted to slide longitudinally on the underside of upper supporting plate 31 (see arrow in FIG. 5). Lower supporting plate 33 is thus illustrated in the extended position in FIG. 5, in which integrated cup holder 37 is exposed. A trough-shaped indentation 39 over a wide area is integrated into the top of upper supporting plate 31, in which a storage shell 41 is detachably held, for example by magnetic force. Upper supporting plate 31 has an additional storage area 43 between storage shell 41 and telescopic rails 35.

Figure 8:
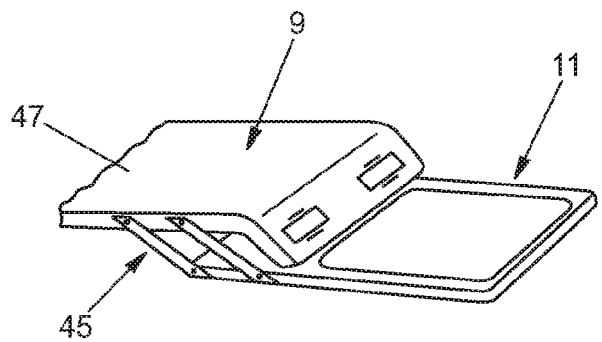
FIGS. 8 to 16 show different technical implementations of the storage element.

Additional design variants of storage element 11 are shown in the following FIGS. 8 through 16. In FIG. 8, storage table 11 is no longer solely able to slide in a translatory manner with the aid of telescopic rails 35, but is mounted on a supporting section 47 of instrument panel 9 with the aid of a four-bar linkage 45. The adjustment between the position of non-use and the position of use thus takes place by a combination of a rotatable and a translatory movement.

Figure 9:
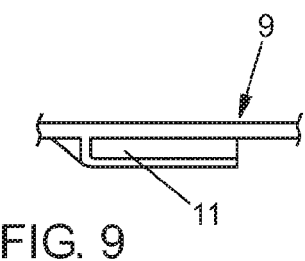
Figure 10:
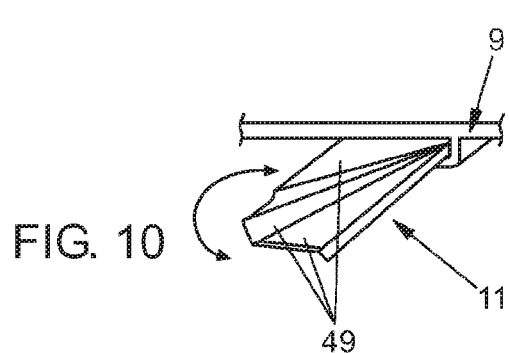

In FIGS. 9 and 10, storage table 11 is no longer designed with a component-rigid supporting plate but rather as a compartment, which is divided into triangular segments 49, shown by way of example in FIG. 10. Triangular segments 49 have a deformable or foldable design, whereby storage table 11 may be stowed in instrument panel 9 in the position of non-use (FIG. 9), in a manner favorable to installation space.

Figure 11:
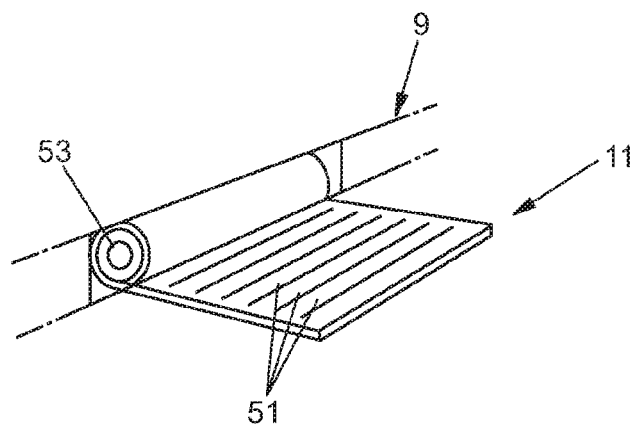
Figure 12:
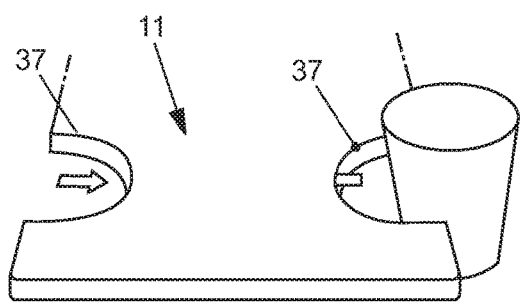
Figure 13:
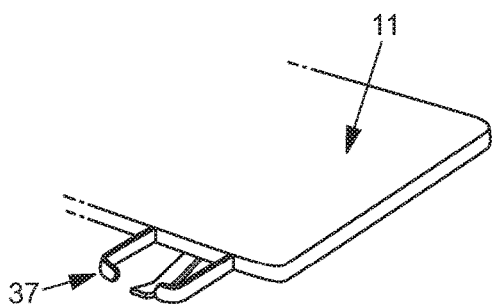

In FIG. 11, storage table 11 is constructed in the manner of a roller blind, which also has individual segments 51, which may be rolled up or down on a winding unit 53. In FIGS. 12 and 13, storage table 11 is designed as a component-rigid supporting plate, in which cup holders 37 are integrated as recesses in the edge of storage table 11 (FIG. 12). In FIG. 13, cup holder 37 is alternatively formed by possibly elastically deformable individual arms on the edge of storage table 11.

Figure 14:
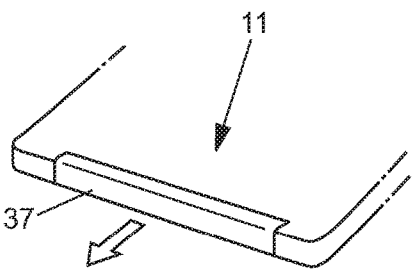
Figure 15:
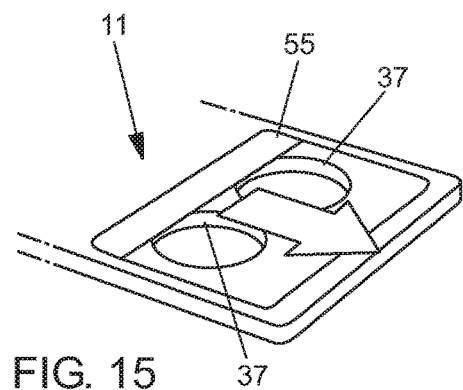
Figure 16:
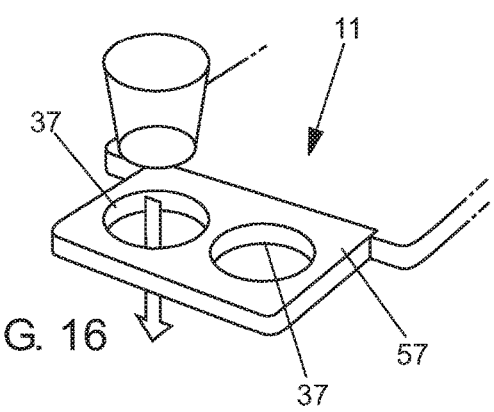

In FIG. 14, cup holder 37 is also adjustably disposed and extendable from storage table 11 in the direction of the arrow. In FIG. 15, two cup holders 37 are integrated as circular recesses into storage table 11 and may be covered with the aid of an adjustable cover 55. In FIG. 16, storage table 11 is elongated on one edge side by an additional supporting plate 57, in which cup holders 37 are integrated as circular recesses.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle comprising:
   a driver assistance device, with the aid of which an autonomous driving mode without driver intervention is carried out in an autopilot mode;
   at least one storage element for storing objects, the storage element being adjustable between a position of non-use and a position of use, the at least one storage element being at least one of a storage table or a cup holder; and
   a control unit assigned to the driver assistance device, the control unit facilitating an adjustment of the storage element into the position of use when the autopilot mode is activated and disables an adjustment of the storage element into the position of use when the autopilot mode is deactivated.

2. The vehicle according to claim 1, wherein the position of use of the storage element is an autopilot position of use, and in addition to the autopilot position of use, at least one additional position of use of the storage element is provided, which differs from the autopilot position of use.

3. The vehicle according to claim 2, wherein, when the autopilot mode is activated, the control unit also enables an adjustment into the at least one additional position of use in addition to the adjustment into the autopilot position of use and when the autopilot mode is deactivated, the control unit enables the adjustment of the storage element into the at least one additional position of use.

4. The vehicle according to claim 1, wherein the adjustment of the storage element into the position of use is adapted to be manually or with the aid of external energy, an electromechanical, or hydraulic actuator, or wherein the adjustment of the storage element into the position of use is initiated by actuating a control element.

5. The vehicle according to claim 1, wherein the storage element is automatically adjustable into the position of use upon the activation of the autopilot mode.

6. A vehicle comprising:
 a driver assistance device, with the aid of which an autonomous driving mode without driver intervention is carried out in an autopilot mode;
 at least one storage element for storing objects, the storage element being adjustable between a position of non-use and a position of use; and
 a control unit assigned to the driver assistance device, the control unit facilitating an adjustment of the storage element into the position of use when the autopilot mode is activated and disables an adjustment of the storage element into the position of use when the autopilot mode is deactivated,
 wherein the storage element is disposed within the vehicle interior on an instrument panel, on a center console or on a side trim, and wherein the adjustment of the storage element between the position of non-use and the position of use is performed in at least one of a translatory or rotatable manner in at least one of a vehicle longitudinal, transverse or vertical direction.

7. A vehicle comprising:
 a driver assistance device, with the aid of which an autonomous driving mode without driver intervention is carried out in an autopilot mode;
 at least one storage element for storing objects, the storage element being adjustable between a position of non-use and a position of use; and
 a first control unit assigned to the driver assistance device, the first control unit facilitating an adjustment of the storage element into the position of use when the autopilot mode is activated and disables an adjustment of the storage element into the position of use when the autopilot mode is deactivated,
 wherein the driver assistance device is assigned a second control unit via which at least one of a vehicle passenger seat or a driver's seat is adjustable into a comfort position upon the activation of the autopilot mode, and wherein the second control unit disables an adjustment of the vehicle seat into the comfort position when the autopilot mode is deactivated.

8. The vehicle according to claim 7, wherein the first control unit enables the adjustment of the storage element into the position of use only when both the autopilot mode has been activated and the vehicle seat has been adjusted into the comfort position.

9. The vehicle according to claim 7, wherein the vehicle seat is autonomously adjustable into a comfort position upon the activation of the autopilot mode, and the storage element and the vehicle seat form a comfort unit in which both the storage element is adjustable into the position of use and the vehicle seat is adjustable into the comfort position upon the activation of the autopilot mode, and wherein the two adjustment operations take place autonomously and in a time-correlated manner or substantially simultaneously.

10. A vehicle comprising:
 a driver assistance device, with the aid of which an autonomous driving mode without driver intervention is carried out in an autopilot mode;
 at least one storage element for storinq objects, the storage element being adjustable between a position of non-use and a position of use; and
 a control unit assigned to the driver assistance device, the control unit facilitating an adjustment of the storage element into the position of use when the autopilot mode is activated and disables an adjustment of the storage element into the position of use when the autopilot mode is deactivated,
 wherein the position of use of the storage element is an autopilot position of use, and in addition to the autopilot position of use, at least one additional position of use of the storage element is provided, which differs from the autopilot position of use, and
 wherein the storage element is autonomously returnable from the autopilot position of) use into the at least one additional position of use or into the position of non-use upon deactivation of the autopilot mode, and wherein a vehicle seat is autonomously adjustable from a comfort position into a position suitable for driving for the vehicle occupants.

* * * * *